United States Patent
Döbbeler et al.

(10) Patent No.: US 8,410,800 B2
(45) Date of Patent: Apr. 2, 2013

(54) METHOD FOR DETERMINING THE SIZE AND SHAPE MEASURE OF A SOLID MATERIAL IN AN ARC FURNACE, AN ARC FURNACE, A SIGNAL PROCESSING DEVICE AND PROGRAM CODE AND A MEMORY MEDIUM

(75) Inventors: Arno Döbbeler, Herzogenaurach (DE); Klaus Krüger, Hamburg (DE); Thomas Matschullat, Eckental (DE); Detlef Rieger, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 12/865,185

(22) PCT Filed: Jan. 12, 2009

(86) PCT No.: PCT/EP2009/050243
§ 371 (c)(1),
(2), (4) Date: Jul. 29, 2010

(87) PCT Pub. No.: WO2009/095293
PCT Pub. Date: Aug. 6, 2009

(65) Prior Publication Data
US 2010/0327888 A1 Dec. 30, 2010

(30) Foreign Application Priority Data
Jan. 31, 2008 (DE) .......... 10 2008 006 966

(51) Int. Cl.
*G01R 27/08* (2006.01)
*H05B 7/148* (2006.01)

(52) U.S. Cl. .......... 324/699; 373/104
(58) Field of Classification Search .......... 324/699; 373/104
See application file for complete search history.

(56) References Cited

U.S. PATENT DOCUMENTS
(Continued)

FOREIGN PATENT DOCUMENTS
CN 1379826 A 11/2002
CN 1429918 A 7/2003
(Continued)

OTHER PUBLICATIONS
German Office Action for Application No. 10 2008 006 958.2 (7 pages), Jan. 22, 2009.
(Continued)

*Primary Examiner* — Jeff Natalini
(74) *Attorney, Agent, or Firm* — King & Spalding L.L.P.

(57) ABSTRACT

In a method for determining the size and shape value (M) for a solid material (S), in particular scrap metal, in an arc furnace (1), an electrode flow fed to an electrode (3a, 3b, 3c) for forming an arc furnace (L) between the electrode (3a, 3b, 3c) and the solid (S) is measured (30) and from the measured electrode flow (I (t)), an effective measurement value of the electrode flow is determined (31) and from the measured electrode flow (I (t)) (32), a flow part associated with a frequency range of the measured electrode flow is determined (32), and a quotient of the flow part and an effective measurement value is formed as a measurement of the shape and size value of the flow (M). Thus, a method is provided that enables a property of a fusible element introduced into one of the arc furnaces to be determined.

18 Claims, 2 Drawing Sheets

U.S. PATENT DOCUMENTS

| | | | | |
|---|---|---|---|---|
| 4,135,052 | A | | 1/1979 | Stenkvist et al. ............. 373/108 |
| 4,656,331 | A | * | 4/1987 | Lillquist et al. .......... 219/121.47 |
| 5,050,185 | A | | 9/1991 | Bourge et al. ................. 373/104 |
| 5,331,661 | A | * | 7/1994 | Maguire et al. ............... 373/105 |
| 5,527,387 | A | * | 6/1996 | Andersen et al. ............. 106/693 |
| 7,217,121 | B2 | | 5/2007 | Thomson et al. ............... 431/12 |
| 2006/0060574 | A1 | * | 3/2006 | Blankenship et al. ... 219/130.21 |
| 2008/0198894 | A1 | | 8/2008 | Matschullat ................... 373/104 |
| 2008/0285615 | A1 | | 11/2008 | Fink et al. ..................... 373/104 |
| 2008/0304538 | A1 | | 12/2008 | Schubert .......................... 373/96 |
| 2008/0307926 | A1 | | 12/2008 | Matschullat .................... 75/386 |

FOREIGN PATENT DOCUMENTS

| | | |
|---|---|---|
| DE | 4425089 | 1/1996 |
| DE | 29713666 | 11/1997 |
| DE | 19801295 | 7/1999 |
| DE | 102005034409 | 5/2006 |
| DE | 102005034378 | 1/2007 |
| EP | 0403413 | 6/1990 |
| EP | 0637634 | 8/1994 |
| FR | 2670571 | 6/1992 |
| JP | 2008115408 | 5/2008 |
| SU | 935534 | 6/1982 |
| WO | 2006131464 | 12/2006 |
| WO | 2007009861 A2 | 1/2007 |
| WO | 2007009924 | 1/2007 |

OTHER PUBLICATIONS

German Office Action for Application No. 10 2008 006 965.6 (6 pages), Jan. 27, 2009.

German Office Action for Application No. 10 2008 006 966.3 (6 pages), Dec. 17, 2008.

International Search Report and Written Opinion for Application No. PCT/EP2009/050241 (13 pages), Jun. 3, 2009.

International Search Report and Written Opinion for Application No. PCT/EP2009/050925 (12 pages), Apr. 27, 2009.

International Search Report and Written Opinion for Application No. PCT/EP2009/050243 (12 pages), Aug. 3, 2009.

Matschullat et al., "Foaming Slag and Scrap Melting Behavior in Electric Arc Furnace—A New and Very Precise Detection Method with Automatic Carbon Control" Archives of Metallurgy and Meterials of the Polish Academy of Sciences, Bd. 53, Nr.2, s. 399-403 XP002528409 (5 pages), Mar. 1, 2008.

Thomson. "Electric Furnace Arcs Screening—is with Frothing Agent of Slag Set by Measuring Acoustic Signals at Upper and Lower Limits of Frequencies Range" XP002401121 (1 page), Jan. 1, 1900.

Dmochowski, Z. "High-Current Measurements in Arc Furnace", in Elektrowarme International 39 (1981), B5, S.B. 254 bis B261, English translation, 13 pages, Oct. 1, 1981.

* cited by examiner

METHOD FOR DETERMINING THE SIZE AND SHAPE MEASURE OF A SOLID MATERIAL IN AN ARC FURNACE, AN ARC FURNACE, A SIGNAL PROCESSING DEVICE AND PROGRAM CODE AND A MEMORY MEDIUM

CROSS-REFERENCE TO RELATED APPLICATIONS

This application is a U.S. National Stage Application of International Application No. PCT/EP2009/050243 filed Jan. 12, 2009, which designates the United States of America, and claims priority to DE Application No. 10 2008 006 966.3 filed Jan. 31, 2008. The contents of which are hereby incorporated by reference in their entirety.

TECHNICAL FIELD

The invention relates to a method for determining a size and shape measure for solid material in an arc furnace. The invention also relates to an arc furnace having a signal processing device, to a signal processing device, and to a memory medium and program code for carrying out the method.

BACKGROUND

An arc furnace is used to produce liquid metal, generally steel. The liquid metal is produced from scrap metal or reduced iron together with further additives. At present, an arc furnace is operated virtually independently of the solid material to be melted in the arc furnace. The arc furnace is therefore operated, in particular an arc is set, statically, that is to say on the basis of a fixed process plan, with respect to the material to be melted supplied to the arc furnace. This leads to the arc furnace not being operated optimally from technical and financial points of view. For example, charging times or tapping times are not chosen optimally since either too long a time period is allowed for charging with new solid material, or charging is already stopped, even though not enough solid material has yet been melted in the arc furnace.

Laid-open specification DE 10 2005 034 378 A1 discloses a method for determining a condition of the content of an arc furnace. However, it remains unclear how a method such as this according to the laid-open specification is intended to operate.

SUMMARY

According to various embodiments, a method of the type mentioned initially can be provided by means of which it is possible to determine a property of a material to be melted supplied to the arc furnace. According to other embodiments, an arc furnace, a signal processing device, a program code and a memory medium can be provided for carrying out a method such as this.

According to an embodiment, in a method for determining a size and shape measure for solid material, in particular scrap metal, in an arc furnace, an electrode current can be detected which is supplied to an electrode in order to form an arc between the electrode and the solid material, wherein a root mean square value measure of the detected electrode current is determined from the detected electrode current, wherein a current component which is associated with a frequency range of the detected electrode current is determined from the detected electrode current, and wherein a quotient of the current component and root mean square value measure is formed as the size and shape measure.

According to a further embodiment, the current component which is associated with the frequency range of the detected electrode current can be determined by Fourier transformation of the detected electrode current. According to a further embodiment, the electrode may be operated at an operating frequency, and the frequency range may be restricted essentially to the operating frequency of the electrode. According to a further embodiment, the electrode can be operated at an operating frequency, and the frequency range essentially does not cover the operating frequency of the electrode. According to a further embodiment, a process variable of the arc furnace may be controlled and/or regulated by the determined shape and size measure.

According to another embodiment, a signal processing device for an arc furnace, may have a machine-legible program code which has control commands which cause the signal processing device to carry out a method as described above.

According to yet another embodiment, a machine-legible program code for a signal processing device for an arc furnace, may have control commands which cause the signal processing device to carry out the method described above.

According to yet another embodiment, a memory medium may have a machine-legible program code stored in it as described above.

According to yet another embodiment, an arc furnace may have at least one electrode, an electrode current detection device for detecting an electrode current which is supplied to the at least one electrode, and a signal processing device as described above, wherein the electrode current detection device is operatively connected to the signal processing device.

According to a further embodiment of the arc furnace, the signal processing device may be operatively connected to a control and/or regulating device for determining a manipulated variable for a process variable of the arc furnace from the size and shape measure.

BRIEF DESCRIPTION OF THE DRAWINGS

Further advantages of the invention will become evident from the following exemplary embodiment, which will be explained in more detail with reference to the attached drawings, in which.

DETAILED DESCRIPTION

Figure 1:
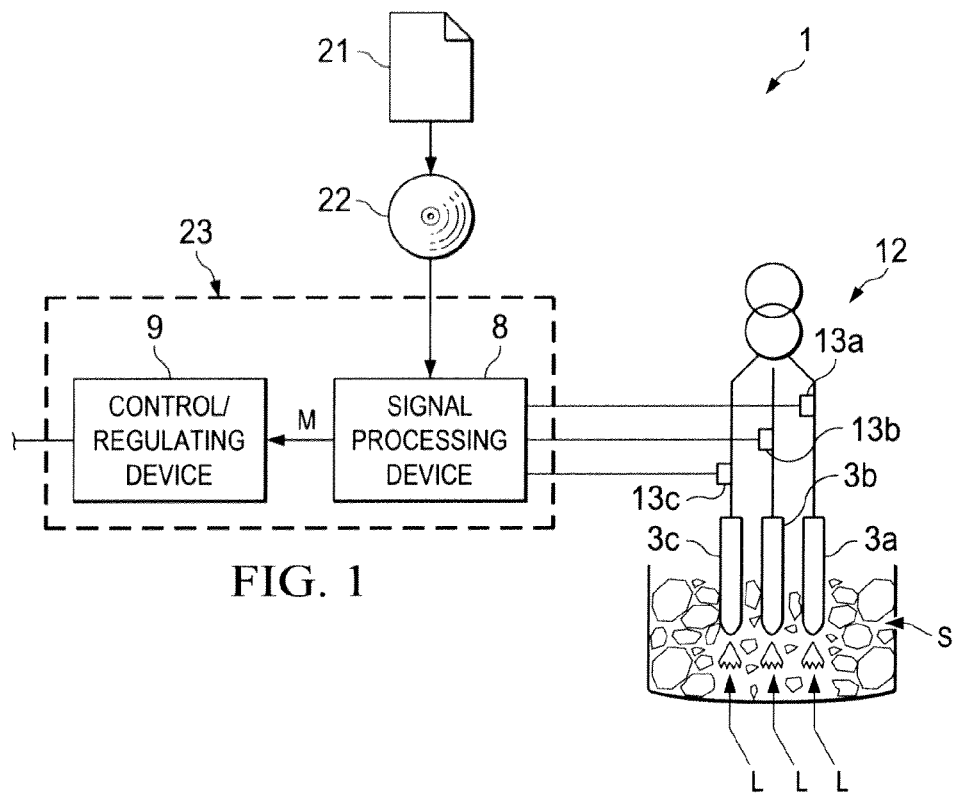
FIG. 1 shows a schematic view of an arc furnace.

According to various embodiments, in a method for determining a size and shape measure for solid material, in particular scrap metal, in an arc furnace, an electrode current is supplied to an electrode in order to form an arc between the electrode and the solid material, wherein the supplied electrode current thereof is detected, wherein a root mean square value measure of the electrode current is determined from the detected electrode current, wherein a current component which is associated with a frequency range of the detected electrode current is determined from the detected electrode current, and wherein a quotient of the current component and root mean square value measure is formed as the size and shape measure. A quotient of the current component and root mean square value measure means both the quotient formed from the current component by the root mean square value measure and the quotient formed from the root mean square value measure by the current component.

A measure of the size and shape of a solid material means any specific variable which is suitable for recording differences in the size and shape of the solid material of different size and shape. The size and shape of the solid material means any physical variable of the solid material which influences the burning behavior of the arc on the solid material. In particular, this can mean the size of a cohesive solid material part and/or its compactness, wherein compactness should be understood as a measure of an existing solid material density distribution.

A root mean square value measure means a measure which depends indirectly or directly on the root mean square value of the electrode current in the electrical engineering sense. By way of example, this may be the root mean square value of the electrode current itself, or for example the power or energy calculated from the root mean square value of the electrode current, or some other measure which is related to the root mean square value of the electrode current, for example the square of the electrode current.

In order to carry out the method, the arc furnace has at least one electrode. The claim wording can also be interpreted in this sense. While this application refers to "an electrode", the linguistic meaning of the indefinite article "an" should be used here. This does not indicate a specific number.

The principle according to various embodiments is that the inventors have identified that the burning behavior of the arc which results in the electrode current allows conclusions to be drawn about the condition of the material to be melted on which the arc is acting. The area in which the arc strikes the material to be melted is generally referred to as the arc foot area or arc foot point. A method has been created by means of which the condition of the material to be melted, in particular in an arc foot area of the arc, can be deduced from a detected electrode current. This for the first time allows the arc furnace to be regulated dynamically as a function of the solid material in the arc furnace. According to various embodiments, it is made possible to improve the economy of an electrical arc furnace since the method according to various embodiments allows energy to be introduced into the arc furnace as a function of the condition of the solid material to be melted in the arc.

According to a further embodiment, the current component which is associated with the frequency range of the detected electrode current is determined by Fourier transformation of the electrode current. The Fourier transformation is a simple instrument for converting a signal from a time domain to a frequency domain. In particular, there are a multiplicity of variations which can allow signals in the time domain to be converted in this way by means of Fourier transformation. This can be done using discrete Fourier transformation, a Fourier series, continuous Fourier transformation, fast Fourier transformation and possibly further variations of Fourier transformation. The Fourier transformation is a simple and familiar capability for quickly and efficiently carrying out this method step for converting the electrode current signal from the time domain to the frequency domain.

According to a further embodiment, the electrode is operated at an operating frequency, and the frequency range is restricted essentially to the operating frequency of the electrode. A refinement such as this can be used in particular for a polyphase electrical arc furnace. The majority of the electrical arc furnace capacity installed now comprises polyphase electrical arc furnaces. In this case, in general, a periodic voltage is applied to three electrodes, with the arc being struck at each of the voltage maxima and being virtually quenched in between the maxima. The arc is generally pulsed at twice the frequency of the operating frequency of the electrode. The operating frequency is that frequency of an electrical variable which is applied to the electrode, in general in order to operate the arc. Restricting the frequency range to be evaluated essentially to the operating frequency of the electrode therefore results in the current component of the fundamental being determined. This can be done particularly easily.

According to a further embodiment, the electrode is operated at an operating frequency, and the frequency range essentially does not precisely cover the operating frequency of the electrode. The current components of the harmonics are determined in this case. The statements relating to the operating frequency of the electrode made in the previous paragraph apply analogously to determining the current component of the harmonics of the operating frequency of the electrode.

The current component of the fundamental and a current component which is complementary to the fundamental current component are particularly suitable for determining the size and shape measure. The fundamental current component and the harmonic current component are not independent of one another, but complement one another to form the total electrode current, and can therefore be considered complementary. The harmonic current component can therefore easily be calculated with the aid of the fundamental current component and the detected electrode current, and the fundamental current component can be calculated with the aid of the harmonic current component and the detected electrode current. In this case, when calculating the harmonic current component, a person skilled in the art can consider only those current components which exceed a specific, definable threshold value.

If the current component of the fundamental is related to the root mean square value measure, or the current component of the harmonics is related to the root mean square value measure, then this results in a particularly advantageous variable which provides information on the size and shape of the solid material in the arc furnace, in particular at the arc foot area. This is because the size and shape of the solid material affect the burning behavior of the arc. The arc burning behavior is implicitly included in the measured electrode current. A relative measure of the size and shape of solid material in the arc foot area can therefore be obtained by evaluating the electrode current.

According to a further embodiment, the size and shape measure is used to control and/or regulate at least one process variable of the arc furnace. By way of example, the determined size and shape measure can be used to separately for each electrode control or regulate the energy to be introduced into the material to be melted via a plurality of electrodes, corresponding to the determined size and shape measure. If, for example, a size and shape measure is determined among one of the electrodes which is to be linked to heavy scrap metal or to a "skull", then it is possible to increase the arc power for this electrode, for example at the expense of the other two electrodes. A process variable means any adjustable physical variable which influences, preferably substantially, the process of melting the solid material. It is particularly advantageous to provide a method for operating an arc furnace having at least one electrode, wherein a solid material supplied to the arc furnace is melted by means of an arc formed by the at least one electrode, wherein a measure of the size and shape of the solid material is determined, and the determined size and shape measure is used to control and/or regulate a process variable of the arc furnace.

The method for determining a size and shape measure in an arc foot area in an arc furnace can advantageously be combined with further methods for determining state variables in an arc furnace. It is therefore possible to dynamically match the operation of an arc furnace as completely as possible to state variables which are in each case present in the arc furnace during a steel production process.

According to yet another embodiment, a signal processing device for an arc furnace, may have a machine-legible program code which has control commands which cause the signal processing device to carry out a method as described above. This allows the size and shape measure for solid material to be determined automatically, and a process variable of the arc furnace can be controlled and/or regulated directly on the basis of the size and shape measure, as required. Alternatively, manipulated variables of the arc furnace can also be manually adjusted by the operator on the basis of the size and shape measure which is determined and preferably output, in particular output in graphic form.

According to yet another embodiment, a memory medium may have a machine-legible program code stored on it as described above.

Furthermore, according to other embodiments, an arc furnace comprises at least one electrode, an electrode current detection device for detecting an electrode current which is supplied to the at least one electrode, and a signal processing device as described above, wherein the electrode current detection device is operatively connected to the signal processing device. This makes it possible to provide an arc furnace which can be operated better on the basis of a determined size and shape measure.

According to a further embodiment of the arc furnace, the signal processing device is operatively connected to a control and/or regulating device for determining a manipulated variable for a process variable of the arc furnace from the size and shape measure. The signal processing device and the control and/or regulating device can be designed such that they are physically combined or separated from one another. The interaction of these two devices allows automated improved operation of the arc furnace. In particular, the position control of the electrodes, the energy introduced, the prediction of charging times and/or tapping times, can be improved. A manipulated variable for a process variable means any variable by means of which a process variable can be adjusted indirectly or directly.

FIG. 1 shows an electrical arc furnace 1 having a plurality of electrodes 3a, 3b, 3c, which are coupled via power supply lines to a power supply device 12. The power supply device 12 preferably has a furnace transformer.

Charge materials, such as, for example, scrap steel and/or iron and/or direct-reduced iron, possibly with alloy means and/or additives, are melted in the electrical arc furnace 1 with the aid of three electrodes 3a, 3b, 3c.

Until now, there has been no knowledge of what scrap metal is located under what electrode 3a, 3b, 3c at what time. The energy introduced through the electrodes 3a, 3b, 3c is therefore regulated statically, that is to say independently of the scrap metal currently located essentially under the electrode 3a, 3b, 3c and affected by the arc L. In general, the electrode current, and therefore the position of the respective electrode 3a, 3b, 3c, is regulated on the basis of the impedance, such that the arc length of the respective arc L is substantially constant.

In the illustrated example, electrode current detection devices 13a, 13b, 13c are provided on the power supply lines of the electrodes 3a, 3b, 3c and can be used to measure the electrode current and/or voltage, and/or the energy supplied to the electrodes 3a, 3b, 3c. The electrode current detection devices 13a, 13b, 13c are operatively connected to a signal processing device 8. This means that signals are transmitted contactlessly or with contact between at least one electrode current detection device 13a, 13b, 13c and the signal processing device 8. In this case, the transmitted signals represent the electrode current detected over time. Signals such as these are preferably transmitted continuously and for all the electrode currents supplied to the electrodes 3a, 3b, 3c.

Figure 2:
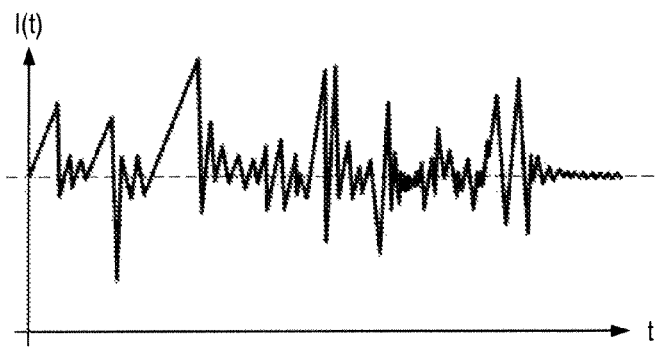
FIG. 2 shows an illustration of a time-dependent electrode current signal for an electrode in the arc furnace.

The process of determining the size and shape measure will be explained by way of example using, for example, the electrode 3a of the electrical arc furnace 1. A size and shape measure is preferably determined continuously during operation of the electrical arc furnace, and for all the electrodes 3a, 3b and 3c. The electrode current recorded over time for an electrode 3a (see FIG. 1), detected by the electrode current detection device 13a (see FIG. 1), is shown in FIG. 2. The measured or detected electrode current is digitized, if the data is not yet in digital form. This is done using a sufficiently high sampling rate, for example of 12 000 samples per second. The magnitude of the sampling rate is dependent on the electrode current changes that occur over time: dI(t)/dt. In this case, I(t) is the electrode current signal, which varies over time and is associated with the electrode current, and t is the time. The more quickly the electrode current varies over time, the higher the sampling rate must in general be chosen to be in order to detect changes in the electrode current with appropriate accuracy. If necessary, the sampling rate can be adjusted as a function of electrode current changes to be expected.

Before the signal processing device 8 is used to evaluate the method, the method is preferably supplied once in the form of a machine-legible program code 21, by means of a memory medium 22, for example a compact disk, and is stored in the programmable-logic signal processing device 8. The signal processing device 8 is therefore prepared to carry out a method for determining a size and shape measure of a solid material in an electrical arc furnace.

The electrode current signals I(t) detected by means of the electrode current detection device 13a are supplied to the prepared signal processing device 8. The electrode current signal I(t) is transformed from the time domain to the frequency domain in the signal processing device 8, thus resulting in an electrode current I(f) which is split into frequency components, where f is a frequency. In an equivalent form to I(f), it is possible to determine I(ω), where ω=2πf. The electrode current signal is preferably transformed from the time domain to the frequency domain by means of Fourier transformation. However, other transformation methods for converting a signal from a time domain to a frequency domain may also be suitable for this purpose. These are likewise available to a person skilled in the art.

A frequency range to be evaluated is now defined from the frequency spectrum of the transformed electrode current signal. Preferably, the frequency range is essentially precisely the operating frequency of the electrode, or covers a frequency range which substantially does not precisely cover the operating frequency of the electrode.

Figure 3:
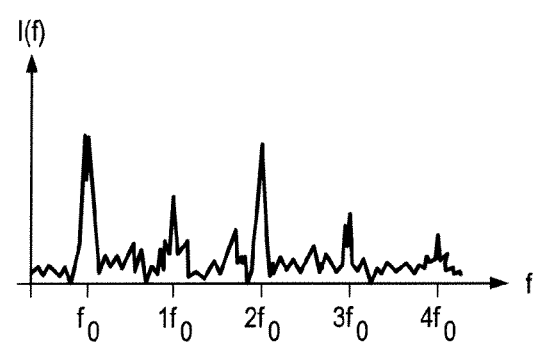
FIG. 3 shows an illustration of a frequency-dependent electrode current signal in a limited time window.
Figure 4:
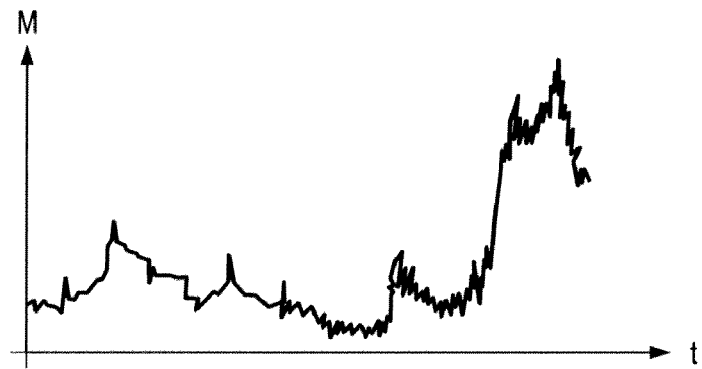
FIG. 4 shows a time profile of the size and shape measure for one electrode in the arc furnace.

FIG. 3 shows a detail of the electrode current signal, transformed to the frequency domain, of the electrode current signal, a section of which is illustrated in FIG. 2, of the electrode 3a (see FIG. 1). As can be seen, the highest signal contributions to the electrode current occur at the fundamental frequency $f_0$ of the electrode current and its multiples n times f, where n=2, 3, 4, . . . . However, in general, this is true only when averaged over time. In general, the fundamental frequency $f_0$ is the power supply system frequency of the power supply system which is applied to the electrodes of the electrical arc furnace. For example, this is generally 50 Hz in Europe, and 60 Hz in North America. In general, the fundamental frequency $f_0$ is the operating frequency of the electrode, and is therefore half the arc striking frequency.

In addition, the root mean square value of the current supplied to the electrode is determined. The root mean square value is not shown in the figures. However, it likewise varies over time, in the same way as the electrode current signal I(t).

A quotient, for example of the sum of the current components at those frequencies which are a multiple of the fundamental frequency, that is to say $2f_0$, $3f_0$, $4f_0$, etc., and the root mean square value measure, for example the root mean square value of the electrode current, is formed as a size and shape measure of the solid material in the arc furnace 1. The only current components that are added are preferably those at frequencies whose current component is not below a threshold value or whose contribution is not negligibly small. To good approximation, the quotient therefore indicates the percentage harmonic current component of the electrode current. This is suitable as a size and shape measure since it provides an indication of the burning behavior of the arc, which depends on the size and shape of the solid material at the arc foot point. Alternatively, the fundamental current component can be used as the size and shape measure. Both components are equally suitable for use as the size and shape measure. It is generally preferable to determine the fundamental current component as the size and shape measure, because this can be determined more easily. The harmonic current component can also be determined by appropriate normalization indirectly as one minus the fundamental current component, with the sum of all the electrode current components being normalized with respect to one.

FIG. 3 illustrates a size and shape measure as a signal which is proportional to the percentage harmonic current component of the electrode current. A relative rise in the size and shape measure indicates that it is more difficult for the solid material to be melted by the burning arc. That is to say the solid material under the electrode is more solid than previously and will take longer to melt if the same amount of energy is introduced. For example, the size and shape measure illustrated in FIG. 3 shows a significant rise at later times. This indicates that now a solid, larger piece of scrap metal is located under the relevant electrode, on which scrap metal piece the arc is now burning.

It is now possible to use this rise in the size and shape measure to ensure that a control and/or regulating device 9 regulates a process variable of the arc furnace, for example the impedance of the electrode 3a, such that more energy is introduced into the arc furnace by means of the electrode 3a, thus allowing the heavy scrap metal to be melted more quickly.

This therefore results in more uniform melting of the solid material to be melted in the arc furnace. The operation of the electrical arc furnace is improved.

In particular, the time profile of the size and shape measure can be used to better define charging times and tapping times. If, for example, no significant rise in the size and shape measure is observed over a relatively long time, then this indicates that the material to be melted is now mainly in liquid form. Further scrap metal can therefore be added to the arc furnace, or tapping can be carried out. The improved determination of the charging and/or tapping times increases the throughput of the electrical arc furnace, leading to an improvement in economy, and in particular also to energy savings.

Figure 5:
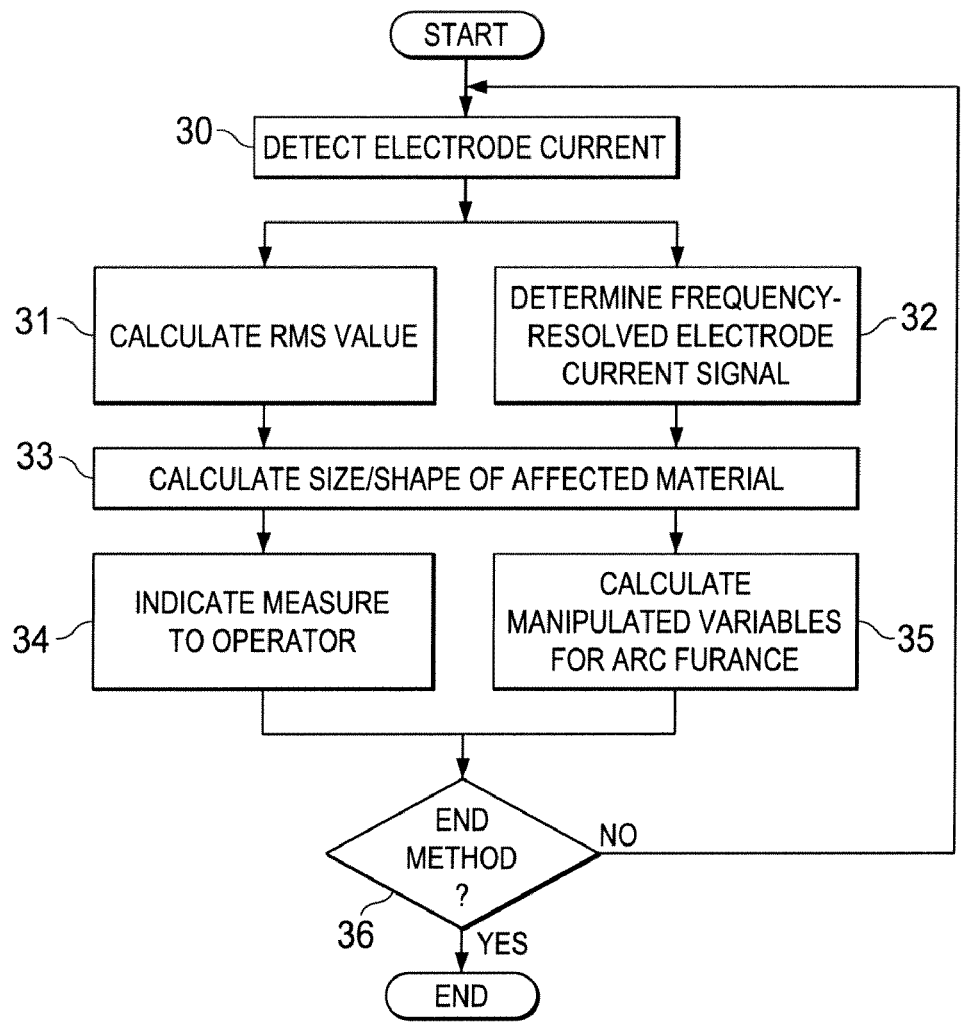
FIG. 5 shows a flowchart of an example of the procedure for the method.

FIG. 5 shows a flowchart which illustrates an example of a procedure for the method. This is based on the assumption that the arc furnace is in operation and that an arc has been provided and has been formed between the electrode and the solid material, in order to melt the solid material.

First of all, the electrode current for each electrode of the arc furnace is detected in a method step 30. The detected electrode current is then used in a method step 31 to calculate a root mean square value measure, for example in the form of the electrode current root mean square value. A frequency-resolved electrode current signal is determined in parallel with this in time from the detected electrode current in a method step 32, and, from this, current components are selected for a frequency range which is significant for determining the size and shape measure. A quotient is then formed from the current components considered to be significant and the root mean square value measure, and is used as a measure of the size and shape of the solid material affected by the arc. On the one hand, this measure is preferably indicated in graphic form to the operator of the arc furnace, in a method step 34. On the other hand, manipulated variables are calculated for the arc furnace from the size and shape measure in a method step 35, which is carried out in parallel with this, in order to advantageously intervene in the melting process. A check is then carried out in a method step 36 to determine whether the method should be ended. If this is not the case, for example because the melting process has not yet been completed, then the method is continued until the method should be ended.

The output of information relating to the size and shape measure to the operator, as well as the control and/or regulation of the arc furnace on the basis of the size and shape measure, are optional features of the method.

What is claimed is:

1. A method for determining a size and shape measure for a solid material in an arc furnace, comprising:
    detecting an electrode current which is supplied to an electrode in order to form an arc between the electrode and the solid material,
    determining a root mean square value measure of the detected electrode current from the detected electrode current,
    determining a current component which is associated with a frequency range of the detected electrode current from the detected electrode current, and
    determining a quotient of the current component and root mean square value, which quotient represents the size and shape measure of the solid material.

2. The method according to claim 1, wherein the current component which is associated with the frequency range of the detected electrode current is determined by Fourier transformation of the detected electrode current.

3. The method according to claim 1, wherein the electrode is operated at an operating frequency, and wherein the frequency range is restricted to the operating frequency of the electrode.

4. The method according to claim 1, wherein the electrode is operated at an operating frequency, and the frequency range does not cover the operating frequency of the electrode.

5. The method according to claim 1, wherein a process variable of the arc furnace is at least one of controlled and regulated by the determined shape and size measure.

6. The method according to claim 1, wherein the solid material is scrap metal.

7. A signal processing device for an arc furnace, comprising a machine-legible program code stored in a non-transitory memory which has control commands which cause the signal processing device to;
- detect an electrode current which is supplied to an electrode in order to form an arc between the electrode and a solid material,
- determine a root mean square value measure of the detected electrode current from the detected electrode current,
- determine a current component which is associated with a frequency range of the detected electrode current from the detected electrode current, and
- determine a quotient of the current component and root mean square value, which quotient represents a size and shape measure of the solid material.

8. The signal processing device according to claim 7, wherein the current component which is associated with the frequency range of the detected electrode current is determined by Fourier transformation of the detected electrode current.

9. The signal processing device according to claim 7, wherein the electrode is operated at an operating frequency, and wherein the frequency range is restricted to the operating frequency of the electrode.

10. The signal processing device according to claim 7, wherein the electrode is operated at an operating frequency, and the frequency range does not cover the operating frequency of the electrode.

11. The signal processing device according to claim 7, wherein a process variable of the arc furnace is at least one of controlled and regulated by the determined shape and size measure.

12. A computer program product comprising machine-legible program code for a signal processing device for an arc furnace, wherein the program code is stored in non-transitory media and has control commands when executed on a computer cause the signal processing device to;
- detect an electrode current which is supplied to an electrode in order to form an arc between the electrode and a solid material,
- determine a root mean square value measure of the detected electrode current from the detected electrode current, determine, a current component which is associated with a frequency range of the detected electrode current from the detected electrode current, and
- determine a quotient of the current component and root mean square value, which quotient represents a size and shape measure of the solid material.

13. The computer program product according to claim 12, wherein the current component which is associated with the frequency range of the detected electrode current is determined by Fourier transformation of the detected electrode current.

14. The computer program product according to claim 12, wherein the electrode is operated at an operating frequency, and wherein the frequency range is restricted to the operating frequency of the electrode.

15. The computer program product according to claim 12, wherein the electrode is operated at an operating frequency, and the frequency range does not cover the operating frequency of the electrode.

16. The computer program product according to claim 12, wherein a process variable of the arc furnace is at least one of controlled and regulated by the determined shape and size measure.

17. An arc furnace comprising:
- at least one electrode,
- an electrode current detection device for detecting an electrode current which is supplied to the at least one electrode in order to form an arc between the electrode and a solid material, and
- a signal processing device configured to:
  - determine a root mean square value measure of the detected electrode current,
  - determine a current component associated with a frequency range of the, detected electrode current based on the detected electrode current, and
  - determine a quotient of the current component and the root mean square value, which quotient is used as a size and shape measure of the solid material,
- wherein the electrode current detection device is operatively connected to the signal processing device.

18. The arc furnace according to claim 17, wherein the signal processing device is operatively connected to at least one of a control and a regulating device for determining a manipulated variable for a process variable of the arc furnace from the size and shape measure.

* * * * *